United States Patent [19]

Castaldi et al.

[11] Patent Number: 4,790,940
[45] Date of Patent: Dec. 13, 1988

[54] PROCESS FOR WASTEWATER TREATMENT

[75] Inventors: Frank J. Castaldi; Timothy W. Trofe; Gordon C. Page; Kevin M. Adams, all of Austin, Tex.

[73] Assignee: Radian Corporation, Austin, Tex.

[21] Appl. No.: 113,796

[22] Filed: Nov. 3, 1987

Related U.S. Application Data

[63] Continuation-in-part of Ser. No. 935,235, Nov. 26, 1986, Pat. No. 4,737,289.

[51] Int. Cl.$^4$ .............................................. C02F 3/34
[52] U.S. Cl. .................................. 210/611; 210/903; 210/904; 210/763
[58] Field of Search ............... 210/611, 903, 904, 763, 210/703, 704, 719; 435/262

[56] References Cited

U.S. PATENT DOCUMENTS 4,654,148  3/1987  Baker ................................. 210/904
4,719,019  1/1988  Vasan ................................. 210/904

FOREIGN PATENT DOCUMENTS 2307669  8/1974  Fed. Rep. of Germany ...... 210/904
55-84598  6/1980  Japan ................................. 210/904
57-21988  2/1982  Japan ................................. 210/904

*Primary Examiner*—Benoit Castel
*Attorney, Agent, or Firm*—Stefan J. Klauber

[57] ABSTRACT

Free cyanide-containing wastewater is treated to destroy the free cyanide content thereof by the step of treating said water with sulfur in the form of polysulfide in an integrated process wherein thiocyanate is also eliminated to produce a non-hazardous wastewater effluent and treating the wastewater in a second step with cultures of bacteria of the genus Thiobacillus in combination with nitrifying bacteria which oxidize ammonia to nitrite to nitrate. The first step is preferably carried out in the presence of a cationic surfactant, preferably a quaternary cationic surfactant, as a catalyst.

12 Claims, No Drawings

4,790,940

PROCESS FOR WASTEWATER TREATMENT

CROSS REFERENCE TO RELATED APPLICATION

This application is a continuation-in-part of Ser. No. 935,235, filed Nov. 26, 1986, now U.S. Pat. No. 4,737,289.

FIELD OF THE INVENTION

This invention relates to a process for wastewater treatment and is more particularly concerned with the treatment of cyanide-containing wastewaters by chemical and biological means to render the wastewater non-hazardous.

BACKGROUND OF THE INVENTION

One of the most important areas in the development of synthetic fuel plants based on fluidized-bed gasification technology is wastewater treatment, particularly to remove cyanide. The presence of cyanide is also a problem in other wastewaters, including spent cyanide liquors which are obtained as by-products in several different industrial processes. Although they are sometimes produced in relatively small quantities, their storage, transport, treatment, and disposal present considerable hazards and serious technological difficulties. Examples of spent liquors are spent cyanide solutions from electroplating and metal finishing shops and barren bleed solutions from gold and silver extraction operations. Cyanide-containing waste scrub gases are produced in fluid catalytic cracking processes. Cyanide is found in industrial wastewaters from coke manufacturing and iron making and from coal gasification and liquefaction. At present, little specific information is available to explain mechanisms for the formation of cyanide during coal coking or coal conversion, but some experts believe that under conditions existing during coal carbonization and gasification ammonia released from coal may be converted to cyanide. Its production is enhanced by high temperatures and it may be derived to some extent by pyrolysis of nitrogenous products obtained as a result of coal decomposition, such as from pyridine.

A number of methods are known for chemically detoxifying cyanide-containing wastewaters. The most common methods for cyanide removal include chemical oxidation, ion exchange, and precipitation. Chemical oxidation includes a variety of processes of which alkaline chlorination is the most common. In this process, chlorine is introduced into a cyanide-contaminated wastewater with a pH greater than 8.5 in order to effect the oxidation of free cyanide to cyanate. Further oxidation of cyanate to carbon dioxide and nitrogen occurs if chlorine and caustic soda are added in excess of the quantity for the first stage of the complete reaction. It is important that the pH of the solution be maintained above 8.5 in order to prevent the release of toxic cyanogen chloride gas from solution. Free cyanide also can be destroyed by hydrogen peroxide and ozone treatment. Another process uses sulfur dioxide, either as gas or as sulfite solution, in the presence of air and a catalyst to oxidize cyanide to cyanate. The cyanide oxidation reaction is catalyzed by the presence of copper ions in solution. The catalytic effect of copper is not unique to the $SO_2$/air oxidation process. Copper has also shown to improve the kinetics and chemical utilization efficiency during ozonation and hydrogen peroxide treatment of cyanide-containing wastewaters, and to catalyze the oxidation of cyanide on granular activated carbon.

Ferrous iron in the form of ferrous sulfate can be added to a wastewater to convert free cyanide to ferrocyanide. Generally, complexation efficiency increases with increasing pH. However, operation at pH values greater than 9.0 is subject to excessive ferrous hydroxide precipitation. In some instances prussian blue is formed during the reaction. The ferrocyanide is removed from the wastewater by application of selective ion exchange treatment. Poor elution of cyanide complexes from strong base anion resins has resulted in continual loss of capacity through repeated regeneration cycles. In practice, spent regenerant disposal presents a problem because of the possibility that this material may be classified hazardous. Since ion exchange merely concentrates the mass of complexed cyanide in a smaller volume regenerant stream, the process still presents waste disposal problems because of the toxic wastes produced.

Precipitation as a chemical treatment alternative is limited to concentrated cyanide streams. This limitation is due to the solubility of the metal cyanides formed during the precipitation reactions. In general, precipitation alone will not lower the cyanide content in wastewater to a concentration that is acceptable for discharge. The deliberate addition of precipitating agents is not considered a cost effective treatment option because of the toxic sludge that is produced.

The use of polysulfides for treatment of cyanide wastewaters was reported at an early date in Wernlund, U.S. Pat. No. 2,194,438, which was issued Mar. 19, 1940. Polysulfide solutions have not only been used for the treatment of cyanide liquors but have also been used commercially to control cyanide induced corrosion in fluid catalytic crackers and cokers and has been recently adapted to scrub hydrogen cyanide from gases produced in the fluid catalytic cracking process. The use of polysulfides to treat concentrated cyanide solutions from electroplating shops has been reported. It has also been proposed to use polysulfides for treating cyanides present in coal gasification wastewaters. Other typical disclosures of the use of polysulfides are found in *Oil and Gas Journal*, (Apr. 14, 1980), pp. 150–153; *Journal WPCF*, Vol. 57, No. 11, (Nov. 1985), pp. 1089–1093; *Environmental Science and Technology*, Vol. 13, No. 12, (December 1979), pp. 1481–1487; and *Journal WPCF*, Vol. 51, No. 9, (September 1979), pp. 2267–2282. While the use of polysulfides has been generally successful, there is definite room for improvement in terms of reaction kinetics and conversion efficiency. Moreover, it is necessary to ensure that the wastewaters are converted to a truly non-hazardous condition for discharge into the environment.

It is accordingly an object of this invention to provide a process for the treatment of cyanide-containing liquid effluents to render them non-hazardous which is highly effective, has a high-reaction rate, and has improved efficiency.

It is another object of the invention to provide a process of the character indicated which involves a catalyzed polysulfide treating step.

It is a further object of the invention to provide an improved process for cyanide removal from cyanide containing waste effluents which involves a novel combination of steps leading to improved results.

BRIEF SUMMARY OF THE INVENTION

These and other objects are achieved, in accordance with the invention, by a process which includes, in one aspect, the treatment of the effluents with polysulfide in the presence of cationic surfactants, especially quaternary cationic surfactants, within a relatively narrow pH range of 9.2 to 10.0, preferably 9.2. In its broader aspects, the process of the invention involves the chemical-biological detoxification of cyanide-containing effluents. The process of the invention employs chemical conversion with polysulfide to transform the free cyanide present to thiocyanate, which is then destroyed by the action of certain gram-negative chemolithotrophic bacteria that produce ammonia and sulfates by metabolizing thiocyanates. The resultant ammonia is biologically converted to nitrate by the action of a separate family of chemoautotrophic bacteria (Nitrobacteraceae) which are cultured together with the thiocyanate-oxidizing microbes. The process will remove the toxicity associated with cyanide-containing wastewaters by eliminating from the wastes not only cyanide, but also thiocyanate, reduced sulfur species (e.g., sulfide), and thiosulfate and ammonia. The process also permits recovery of the catalyst as part of the overall wastewater treatment system.

DETAILED DESCRIPTION

This process for the detoxification of cyanide-containing wastewater is characterized by the fact that free cyanide in water is converted to thiocyanate with polysulfide in an alkaline medium according to the following general equation:

$$CN^- + S_x-S^{-2} \rightarrow SCN^- + S_{x-1}S^{-2}.$$

The thiocyanate is then biochemically hydrolyzed to cyanate and sulfide as follows:

$$SCN^- + H_2O \xrightarrow{bacteria} HS^- + HCNO$$

and cyanate is then hydrolyzed further to carbon dioxide and ammonia:

$$HCNO + H_2O \xrightarrow{bacteria} NH_3 + CO_2$$

and sulfide is oxidized to sulfate:

$$HS^- + 2O_2 \rightarrow HSO_4^-.$$

The ammonia is biochemically oxidized to nitrate as follows:

$$NH_4^+ + 2O_2 \xrightarrow{bacteria} NO_3^- + 2H^+ + H_2O,$$

while alkalinity is reduced as follows:

$$2H^+ + 2HCO_3^- \rightarrow 2H_2O + 2CO_2.$$

The reaction of free cyanide with polysulfide to form thiocyanate has been found to be second order overall at pH 9.2. The form of the rate equation is:

$$\frac{d[CN_T]}{dt} = k[CN_T][S_x - S^{-2}]$$

where:
[$CN_T$] = total free cyanide concentration ([HCN]+[$CN^-$]), moles/liter
[$S_x-S^{-2}$] = concentration of polysulfide, moles/liter
k = reaction rate constant, liters/mole/min $$\frac{d[CN_T]}{dt} = \text{reaction rate, moles/liter/min}$$

The reaction rate declines at pH values less than 9.2 due to reduced polysulfide solubility. At pH values below 9.2, an elemental sulfur-based precipitate will form from polysulfide solutions as the pH is decreased from alkaline to near alkaline conditions.

Experimental observations indicate that the reaction rate constants at 14° C. and 41° C. are 5.36 liters/mole/min and 30.5 liters/mole/min., respectively. Accordingly, it is preferred to carry out the polysulfide treating step of the process wherein the cyanide-containing waste liquid is treated with elemental sulfur, or substances containing sulfur in the polysulfide form, at pH 9.2. However, pH values in the range of 9.2 to 10 also are acceptable. Although elemental sulfur can be employed and is fully effective, it is preferred to use the sulfur in the polysulfide form, e.g., as sodium polysulfide or potassium polysulfide or ammonium polysulfide or calcium polysulfide.

Polysulfide is, of course, a binary compound of sulfur which contains more sulfur than is required by the normal valency of the metal, such as sodium disulfide, sodium trisulfide, sodium tetrasulfide, and sodium pentasulfide and other alkali metal sulfides, as well as alkaline earth metal sulfides, and their ammonium counterparts. Polysulfide as commonly sold commercially, e.g., for purifying cyanide plating solutions, by such manufacturers as DuPont and Moores and Co. is a sodium sulfuret which may contain two or more of the sodium polysulfides and other sulfur compounds and is a well-known article of commerce. Preferably, however, calcium polysulfide is employed. Thus, one aspect of the invention comprises treating the cyanide-containing effluents with any polysulfide within the above-indicated pH range, preferably at pH 9.2, and in the presence of cationic surfactants, especially quaternary cationic surfactants, the concentration range for the surfactant being at least 100 mg/L, preferably 100 mg/L to 3000 mg/L. Cyanide-polysulfide reactions in the presence of the surfactants conducted at temperatures between 25° and 80° C., preferably 70° to 80° C., have been employed and found to be fully effective. In the absence of the surfactant, the reaction rate constants are substantially lower and the subsequent reaction times are longer. The presence of the surfactant during the course of the treatment increases the cyanide to thiocyanate conversion efficiency to the point that free cyanides in the wastewater have been found to be reduced to less than 500 micrograms per liter. The polysulfide employed in the process can be, as mentioned, a known polysulfide such as sodium, potassium, ammonium, or calcium polysulfide. Calcium polysulfide (i.e., commercial lime sulfur solution) has been found to be a less expensive source of polysulfide. On site preparation of calcium polysulfide by reacting calcium hydroxide and elemental sulfur in near boiling water is readily accomplished by mixing in a reactor for half an hour or even less. The preparation can also be effected in less than two hours by mixing at room temperature.

It is a feature of the invention that only moderate amounts of polysulfide are needed, e.g., a polysulfide to cyanide weight ratio of 1:1 to 1.2:1, preferably 1:1, although greater quantities can be employed, if desired, as in conventional polysulfide-treating operations, e.g., a polysulfide to cyanide weight ratio up to 4:1. As used in this invention, the term cationic surfactant comprises organic nitrogen compounds of the following categories:

1. Primary, secondary and tertiary amines with a $C_{12}$ up to a $C_{18}$ alkyl or alkenyl chain, such as an N-alkyltrimethylene diamine where the alkyl or alkenyl group is, e.g., 9-octadecenyl and 2-alkyl-2-imidazoline where the alkyl or alkenyl group is, e.g., heptadecyl or heptadecenyl.

2. Alkyl amine ethoxylates, i.e. ethylene oxide adducts of a primary secondary or tertiary alkyl amine, each alkyl group having 12 to 20 carbon atoms and 10 to 25 ethoxyl groups being present, including such amines with an amide linkage, such as those derived from coconut, oleic, stearic, or tall oil acids.

3. Ethylene diamine alkoxylates containing 10 to 25 alkoxyl groups.

4. Quaternary ammonium salts (quaternary cationic surfactants).

The quaternary ammonium salts are suitably (1) dialkyldimethylammonium salts, (2) alkylbenzyldimethylammonium chlorides, (3) alkyltrimethylammonium salts, and (4) alkylpyridinium halides, the alkyl groups containing 1 to 20 carbon atoms.

Alkyl amine ethoxylates are sold commercially under many well-known trade names, such as Ethomeen, Kemamine, Polyrad, Sipenol, Triton and Trymeen.

Ethylene diamine alkoxylates are manufactured under trade names such as tetronic polyols.

Alkyltrimethylammonium salts are sold under the trade names Acetoquat CTAB, Ammonyx CTAC, Bromat, Kemamine Q9743C, and Mytab. Commercial trade names for surfactants which are dialkyldimethylammonium salts include Adogen 442, Arosurf TA100, Arquad 2C-75, Kemamine Q9702C, and Varisoft 137. Alkylbenzyldimethylammonium chloride surfactants are sold under trade names such as BTC 50, Hyamine 3500, and Variquat B 35. Alkylpyridinium halides are known commercially under trade names which include Acetoquat CPC and Dehyquart C.

The cationic surfactant catalysts are removed from the wastewater after treatment by foam concentration and flotation separation. To facilitate removal of the surfactant catalysts, especially in the case of the quaternary ammonium salts, the catalysts are preferably supported on water-insoluble carriers so that they can be removed and recovered for re-use by a simple filtration, flotation, sedimentation, centrifugation, and the like. Clay supports such as sodium or calcium montmorillonite are effectively used. In the case of the quaternary ammonium salts, they are effectively supported on smectite-type clay by reacting them with such clays to form what are commonly referred to as organoclays.

An organoclay is an organophilic cation-modified clay derived from a clay mineral, generally of the smectite group, for example a bentonite, montmorillonite, hectorite, saponite or the like, by replacing the inorganic exchangeable cations generally alkali or alkaline earth metal cations, which occur in the natural clay mineral, by organic cations, each comprising at least one hydrocarbon radical which has sufficient carbon atoms to render the surface of the cation-exchanged clay hydrophobic.

Among the prior art patents which discuss at length aspects of the preparation and properties of organoclays, as above outlined, are U.S. Pat. Nos. 2,531,427; 2,966,506; 3,537,994; and 4,081,496. Reference may be had to applicable portions of the standard reference work "Clay Mineralogy", 2nd Edition, 1968, by Ralph E. Grim, McGraw Hill Book Company.

In the usual procedure for preparing an organophilic clay pursuant to this prior art, the smectite-type clay, selected, quaternary compound and water are mixed together, preferably at an elevated temperature, typically in the range of 100° F., for a period of time sufficient for the organic quaternary ammonium compound to coat the clay particles. Thereafter, the product can be filtered, washed, dried and ground, or otherwise processed, depending upon intended use. In some instances, e.g., drying and grinding will not be required. Various other modifications of this process may be used depending upon the form of product desired—as will be noted in the referenced patents.

The preferred clay is montmorillonite and the preferred quaternary salt, preferably reacted with the clay to form an organoclay, will have at least two alkyl groups of a chain length of from about 12 to 18 carbon atoms. Organoclays of this type in particular are available from Southern Clay Products, Inc., under trade names such as Claytone 34 and Claytone 40 and from NL Industries, Inc., under trade names such as Bentone 27, 34 and 38.

The commercial products often comprise mixed quaternary ammonium salts, for example a methylbenzyldialkyl-ammonium compound wherein the compound contains 20 to 35% alkyl groups having 16 carbon atoms and 60 to 75% alkyl groups having 18 carbon atoms, and a smectite-type clay.

The cationic surfactant is preferably added to the wastewater as an aqueous solution or dispersion but when it is in supported form such as a quaternary cation surfactant in the form of an organoclay it is suitably added to the wastewater, e.g. in a batch or continuous stirred tank reactor, the catalyst is suitably added as a finely-divided powder.

The amount of quaternary ammonium salt based on the clay with which it is reacted is ordinarily 0.5% to 50%.

The amount of cationic surfactant employed is ordinarily at concentrations of at least 100 mg/L of wastewater, preferably 100 to 3000 mg/L. In the case of supported catalysts, such as organoclays, the amount employed is calculated from the amount of quaternary ammonium salt present on the clay used as catalyst.

The removal of residual sulfide or polysulfide from polysulfide treated wastewaters is accomplished by aeration. Both aqueous sulfides and polysulfides are spontaneously oxidized in the presence of oxygen. The products of the oxidation are primarily thiosulfate, sulfite, and sulfate.

In accordance with the invention, the conversion of the cyanide present in the effluent to thiocyanates is readily effected at an attractive reaction rate and with high efficiency.

In accordance with the invention, the thiocyanates (present in the waste effluents as well as produced by the treatment with polysulfide) are effectively eliminated by treating the reaction product from the above-described effluent-polysulfide-cationic surfactant reaction, or from a polysulfide reaction without such surfactant, by treatment with bacteria of the genus Thiobacillus. The invention thus comprises two aspects. First, the treatment of the undesired cyanide-containing wastewater with polysulfide, preferably in the presence of a cationic surfactant to provide a process of improved reaction rate and efficiency and, secondly, the integration of such a process with the above-described biological treatment to provide a total treating process for converting an objectionable noxious cyanide-containing wastewater into an environmentally-acceptable effluent. The two steps, i.e., the chemical treatment with polysulfide and the biological treatment, are carried out in separate reactors by suitable adjustment of temperatures to provide the temperatures indicated and by suitable adjustment of pH, e.g., by adding sodium hydroxide to provide the pH levels discussed above.

The bacteria employed in the biological process of this invention are known commercially and can be isolated from activated sludges treating coke production wastewaters by selective enrichment. They also can be isolated from activated sludges treating methionine production wastewaters or obtained commercially from Polybac Corporation as the formulation Hydrobac "S". While chemoautotrophic bacteria of the genus Thiobacillus are preferred, it will be understood that obligate chemoautotrophic bacteria of this genus can be readily replaced by chemoheterotrophic microbes of the same genus which can be grown with organic substrates as is well known to persons skilled in the art. In like manner bacteria in the genus Nitrosomonas are the preferred ammonia oxidizers and bacteria in the genus Nitrobacter are the preferred nitrite oxidizers, but equivalent ammonia oxidizers well known to the art such as genus Nitrosospira, genus Nitrosococcus, and genus Nitrosolobus can be readily employed as ammonia oxidizers, and genus Nitrospina and genus Nitrococcus can be employed as nitrite oxidizers.

In this biological treatment, thiocyanates serve as both a source of energy and as a source of carbon and nitrogen for bacteria of the genus Thiobacillus. Many of these microorganisms are strict autotrophs and grow best with thiosulfate as the energy source, but thiocyanate, sulfide, and sulfur also can be used for growth. The optimum pH range for thiocyanate degradation by bacteria is between pH 6.7 and 7.2. An alkaline pH tends to inhibit the biodegradation, and temperatures above 37° C. inhibit the growth of Thiobacillus. The temperature range for optimum growth is between 25° C. and 35° C.

The biodegradation of thiocyanate occurs aerobically with carbon dioxide, sulfate, and ammonia produced as metabolites. The bacteria in genera Nitrosomonas and Nitrobacter are aerobic and oxidize ammonia to nitrite and nitrite to nitrate. These microorganisms are autotrophic in that they possess the ability to derive Adenosine Triphosphate from the oxidation of a reduced inorganic compound and use $CO_2$ as their sole source of carbon.

The thiocyanates are eliminated in accordance with the invention by the culturing of obligate autotrophic sulfur-oxidizing bacteria (i.e., genus Thiobacillus), preferably *Thiobacillus thioparus* and *Thiobacillus neapolitanus*, with Nitrosomonas species and Nitrobacter species, such that the combined population of microorganisms perform key metabolic functions in tandem in order to achieve thiocyanate degradation and attain simultaneous nitrification in a single biological reactor. The process will achieve the described conversions while producing a relatively small amount of biological sludge which results from its autotrophic nature. Typical sludge yields will be an order of magnitude smaller than a conventional heterotrophic process. Experimental observations with the treatment of synthetic fuels processing wastewaters indicate that the process operates best at a cell residence time in excess of 50 days, i.e., 50–150 days, resulting in a hydraulic residence time of about 15 to 50 hours, and at a neutral pH. Experimental testing with the combined microorganism population indicates that the nitrifying bacteria should be cultured at mixed liquor temperatures above 10° C. while the thiocyanate bacteria will not sustain growth at temperatures below 6° C. Temperatures above 37° should be avoided.

It has been found that the integrated processing steps of this invention will detoxify cyanide-containing wastewaters by converting total free cyanides ($[HCN]+[CN^-]$) to nitrates and sulfates such that the resultant effluents will be acceptable for discharge to ordinary receiving water environments and/or municipal sewage treatment works.

EXAMPLE 1

A wastewater in the form of an overhead condensate from a steam stripper treating a quench recycle water from a non-tar producing coal gasifier is used as the material to be treated in this example. It has a pH of 7.0 and contains 1000 mg/L ammonia and 260 mg/L cyanide. The pH of the wastewater is adjusted to 9.2 by the addition of sodium hydroxide as a 50 wt % solution in water. The wastewater is treated in three continuous flow stirred tank reactors operated in series. There is then added to the influent 2045 mg/L of sodium tetrasulfide (20% excess tetrasulfide was used in the process), and 490 mg/L of cetyltrimethylammonium bromide. The mixture is agitated within the reactors at a temperature of 70° C. and the hydraulic residence time of the reactor system is 2.8 hours. It is found by conventional analysis that 99.6% of the detectable free cyanide has disappeared from the effluent of the reactor and the thiocyanate content of the wastewater is 578 mg/L. The quaternary ammonium surfactant present is removed by foam separation in a separate vessel. The free cyanide remaining in the effluent is determined by analysis to be less than 1.0 mg/L. The remaining excess polysulfide is removed by aeration of the effluent in a separate vessel. Reaction under the same conditions, but in the absence of the added quaternary ammonium surfactant requires 8.3 hours of hydraulic residence for the reaction to proceed to the same point.

EXAMPLE 1A

Example 1 is repeated except that 1820 mg/L of cetyltrimethylammonium bromide (CTAB) are added to the wastewater. The free cyanide concentration is reduced to less than 1.0 mg/L after 1.2 hours.

EXAMPLE 1B

Example 1 is again repeated but 2910 mg/L of cetyltrimethylammonium bromide are added to the wastewater. The free cyanide is reduced to less than 1.0 mg/L after only 50 minutes.

EXAMPLE 1C

Example 1 is again repeated, but substantially less of the cetyltrimethylammonium bromide is added, i.e. 70 mg/L. In this case, some catalytic action is observed but not as much as seen in the previous examples. Thus, the free cyanide content is reduced to the same level as in these examples but 7.6 hours are required. This indicates that, for material catalytic action, at least 100 mg/L of the cationic surfactant should be added, although as shown, lesser amounts can have some catalytic effect and the upper limit of the amount added, e.g., 3000 mg/L is governed by economic considerations.

EXAMPLE 1D

Once again repeating Example 1, except that, instead of CTAB, 480 mg/L of an organoclay [dimethyl di(hydrogenated tallow) ammonium bentonite] known as Claytone 40, are added. After 4.1 hours, the free cyanide concentration is reduced to less than 1.0 mg/L.

EXAMPLE 1E

Example 1D is repeated except that 960 mg/L of the organoclay [dimethyl di(hydrogenated tallow) ammonium bentonite-Claytone 40] are added. The free cyanide concentration is reduced to less than 1.0 mg/L in 2.1 hours.

EXAMPLE 1F

In the same way, the following quaternary cationic surfactants are tested by adding them to polysulfide-treated wastewater at 70° C. in the amount of about 490 mg/L.
  Dimethyl di(hydrogenated tallow) ammonium chloride
  n-tetradecyl (60%) hexadecyl (30%) dimethylbenzyl ammonium chloride
  cetylpyridinium chloride In each case, essentially the same catalytic action described in Example 1 is found to occur, i.e., the free cyanide content of the wastewater is reduced to less than 1.0 mg/L in less than 3 hours.

EXAMPLE 1G

In like manner, the catalytic action of the following cationic surfactants is tested in the way described in Example 1F:
  an ethylenediamine alkoxylate manufactured under the trade name Tetronic polyols
  Witcamine AL42-12, an imidazoline (i.e., tertiary amine) with a tall oil fatty acid source.
  tall oil fatty acid diethylene diamine, an amine with amide linkage
  an alkylamine ethoxylate manufactured under the trade name Trymeen TAM-20

Although not as effective as catalysts as the quaternary cationic surfactants, these cationic surfactants show catalytic activity and reduce the free cyanide content of the wastewater to less than 1.0 mg/L after less than 5 hours.

EXAMPLE 2

The procedure described in Example 1 is repeated, except that the catalyzed reaction is carried out in three continuous flow stirred tank reactors operated in series at 80° C. using a hydraulic residence time of 1.7 hours. As in the case of Example 1, the effluent of the process at the end of the treatment is found to contain less than 1.0 mg/L of free cyanide and 99.6% of the original free cyanide is now in the form of thiocyanate.

EXAMPLE 3

Since it is desirable and preferred that the ammonia content of the wastewater subjected to biological treatment in accordance with the invention be at most 350 mg/L, the treated wastewater from Example 1 is steam stripped to produce a wastewater that contains 180 mg/L ammonia, 578 mg/L thiocyanate, 1795 mg/L biochemical oxygen demand, less than 0.5 mg/L free cyanide, and low levels of residual sulfide. This steam-stripped wastewater has a pH of 8.0 and contains 100 mg/L bicarbonate alkalinity. The wastewater is then treated in a continuous flow biological reactor that contains a mixture of microorganisms in the genera Thiobacillus, Nitrosomonas, and Nitrobacter. This reactor is operated at a temperature of 22° C., a mean cell residence time of 58.5 days, a mixed liquor volatile suspended solid concentration of 2130 mg/L, and a hydraulic residence time of 40 hours. If the biological reactions were conducted at the same temperature using a mixed liquor volatile suspended solid concentration of 3000 mg/L, the same treatment level would be achieved in 28 hours of hydraulic residence time. Since there is a drop in pH with time, the desired pH value of 7.0 is maintained by adding sodium hydroxide as a 50 wt % aqueous solution, as needed. A small amount of phosphorus is added as a 75 wt % solution of phosphoric acid to enhance microorganism growth. Aeration and mixing is achieved with bubbler-type porous diffusers providing 0.53 mg oxygen per mg biochemical oxygen demand.

At the end of the reaction period, it is found that all of the thiocyanate and ammonia in the biological treatment reactor influent has been consumed and could not be detected by analysis. All reduced sulfur species are now in the form of sulfate.

EXAMPLE 4

Instead of steam stripping to remove excess ammonia, the treated wastewater from Example 1 is diluted by combining it with steam stripped quench recycle water from a non-tar producing coal gasifier producing a wastewater that contains 260 mg/L ammonia, 130 mg/L thiocyanate, 1160 mg/L biochemical oxygen demand, less than 0.5 mg/L free cyanide, and low levels of residual sulfide. This combined wastewater has a pH of 7.5 and contains 500 mg/L bicarbonate alkalinity. The wastewater is treated in a continuous flow biological reactor that contains a mixture of microorganisms in the genera Thiobacillus, Nitrosomonas, and Nitrobacter. This reactor is operated at a temperature of 22° C., a mean cell residence time of 58.5 days, a mixed liquor volatile suspended solid concentration of 2130 mg/L, and a hydraulic residence time of 24 hours. Since there is a drop in pH with time, the desired pH value of 7.0 is maintained by adding sodium hydroxide as a 50 wt% aqueous solution, as needed. A small amount of phosphorus is added as a 75 wt % solution of phosphoric acid to enhance microorganism growth. Aeration and mixing is achieved with bubbler-type porous diffusers providing 0.53 mg oxygen per mg biochemical oxygen demand.

At the end of the reaction period, it is found that all of the thiocyanate and ammonia in the reactor influent has been consumed and could not be detected by analysis. All reduced sulfur species are now in the form of sulfate.

EXAMPLE 5

This example shows the application of the biological treatment step in accordance with the invention to a wastewater which has been treated with polysulfide without the use of cetyltrimethylammonium bromide.

The wastewater described in Example 1 is treated with polysulfide in accordance with that example, except that the cetyltrimethylammonium bromide is not added, so that a residence time of about 8.3 hours is required to achieve the conversion of cyanide to thiocyanate. The wastewater is then steam stripped to produce an effluent that contains 180 mg/L ammonia, 578 mg/L thiocyanate, 1795 mg/L biochemical oxygen demand, less than 0.5 mg/L free cyanide, and low levels of residual sulfide. This steam-stripped wastewater has a pH of 8.0 and contains 100 mg/L bicarbonate alkalinity. The wastewater is treated in a continuous flow biological reactor that contains a mixture of microorganisms in the genera Thiobacillus, Nitrosomonas, and Nitrobacter. This reactor is operated at a temperature of 22° C., a mean cell residence time of 58.5 days, a mixed liquor volatile suspended solid concentration of 2130 mg/L, and a hydraulic residence time of 40 hours. Since there is a drop in pH with time, the desired pH value of 7.0 is maintained by adding sodium hydroxide as a 50 wt % aqueous solution, as needed. A small amount of phosphorous is added as a 75 wt % solution of phosphoric acid to enhance microorganism growth. Aeration and mixing is achieved with bubbler-type porous diffusers providing 0.53 mg oxygen per mg biochemical oxygen demand.

At the end of the reaction period, it is found that all of the thiocyanate and ammonia in the biological treatment reactor influent has been consumed and could not be detected by analysis. All reduced sulfur species are now in the form of sulfate.

Overall, the absence of cetyltrimethylammonium bromide from the process has the effect of increasing the hydraulic residence time required to achieve the conversion of cyanide to thiocyanate. However, the absence of catalyst will not adversely impact the performance of the biological treatment step.

We claim:

1. A process for the treatment of free cyanide-containing wastewater to destroy the free cyanide content thereof which comprises treating said waters under alkaline conditions with sulfur in the form of polysulfide in a weight ratio of polysulfide to cyanide ranging from 1:1 to 4:1 in the presence of at least 100 mg/l of a cationic surfactant as a catalyst.

2. A process as defined in claim 1, wherein the polysulfide is an alkali metal polysulfide, ammonium polysulfide, or an alkaline earth metal polysulfide.

3. A process as defined in claim 1, wherein the reaction is carried out within a pH range of 9.2 to 10.

4. A process as defined in claim 1, wherein the cationic surfactant is added to the wastewater in the amount of 100 mg/L to 3000 mg/L.

5. A process as defined in claim 1, wherein the cationic surfactant is a quaternary cationic surfactant.

6. A process as defined in claim 1, wherein the cationic surfactant is supported.

7. A process as defined in claim 8, wherein the cationic surfactant is in the form of an organoclay.

8. A process as defined in claim 7, wherein the quaternary organic component has at least two alkyl groups having a chain length of from 12 to 18 carbon atoms and the clay is a montmorillonite clay.

9. An integrated process for treating a wastewater containing free cyanide to convert said cyanide to thiocyanate and to eliminate said thiocyanate to produce a non-hazardous wastewater effluent which comprises the steps of treating a wastewater containing free cyanide with sulfur in the form of polysulfide at a pH in the range of 9.2 to 10, in a weight ratio of polysulfide to cyanide ranging from 1:1 to 4:1 and in the presence of at least 100 mg/l of a cationic surfactant as a catalyst, thereafter adjusting the pH to a range of 6.7 to 7.2 and treating the resultant wastewater with a treating agent consisting essentially of cultures of bacteria of the genus Thiobacillus in combination with nitrifying bacteria effective to oxidize ammonia to nitrite and nitrite to nitrate.

10. A process as defined in claim 9, wherein the nitrifying bacteria comprise the family of chemoautotrophic bacteria, Nitrobacteraceae.

11. A process as defined in claim 9, wherein the reaction with polysulfide is carried out in the presence of a quaternary cationic surfactant as a catalyst.

12. A process as defined in claim 11, wherein the reaction with polysulfide is carried out in the presence of an organoclay as a catalyst.

* * * * *

UNITED STATES PATENT AND TRADEMARK OFFICE
CERTIFICATE OF CORRECTION

PATENT NO. : 4,790,940

DATED : December 13, 1988

INVENTOR(S) : Frank J. Castaldi, Timothy W. Trofe, Gordon C. Page, and Kevin M. Adams It is certified that error appears in the above-identified patent and that said Letters Patent is hereby corrected as shown below:

On page 1, line 9 of the Abstract, change "monia to nitrite to nitrate." to read --monia to nitrite and nitrite to nitrate.--

Signed and Sealed this

Twelfth Day of September, 1989

Attest:

DONALD J. QUIGG

Attesting Officer     Commissioner of Patents and Trademarks